United States Patent [19]

Gueldenpfennig

[11] 3,963,875

[45] June 15, 1976

[54] UNIVERSAL ANSWER ARRANGEMENT FOR A PABX

[75] Inventor: Klaus Gueldenpfennig, Penfield, N.Y.

[73] Assignee: Stromberg-Carlson Corporation, Rochester, N.Y.

[22] Filed: Nov. 4, 1974

[21] Appl. No.: 520,828

[52] U.S. Cl. .................... 179/27 CA; 179/18 BE
[51] Int. Cl.² .......................................... H04M 3/54
[58] Field of Search ....... 179/18 AD, 18 BE, 27 CA

[56] References Cited
UNITED STATES PATENTS

| | | | |
|---|---|---|---|
| 3,542,961 | 11/1970 | Klein et al. ..................... | 179/18 BE |
| 3,673,341 | 6/1972 | Finkhauser ..................... | 179/18 BE |

*Primary Examiner*—William C. Cooper
*Attorney, Agent, or Firm*—William F. Porter, Jr.

[57] ABSTRACT

A universal answer arrangement for a PABX in which incoming trunk calls are automatically connected, when all operator positions are busy or unattended and equipped for universal answer service, to a predesignated line circuit or, at night, to one or more selected operator position circuits. In response to the connection to an associated operator loop circuit, a programmable automatic dialing circuit transmits a programmable predetermined number to a local register which effects a switch-through from the incoming trunk to the designated line circuit. The operator loop circuit monitors the connection and releases from the call when the called line goes off hook. Advantageously, the night answer arrangement includes a PABX group hunting circuit which permits the incoming call to be connected to a second line circuit if the first line circuit is busy or to a tie line trunk to another PABX having a night attendant if all line circuits in the hunting group are busy or disabled.

8 Claims, 9 Drawing Figures

UNIVERSAL ANSWER ARRANGEMENT FOR A PABX

BACKGROUND OF THE INVENTION

The present invention relates in general to telephone systems and more particularly to a universal answering arrangement for use with PABX telephone systems.

A large number of PABX telephone system — for example, those used by many department stores and by most hotels — are not equipped with incoming registers which permit direct connection for incoming calls to the desired line circuit. Rather, incoming calls are connected via incoming trunks to one or more operator positions. The attendant, after answering the call, then extends the call to the desired telephone set. Normally, when all of the attendants are busy, the calling party either receives a busy signal, or oftentimes lengthy ringing until an attendant becomes free to answer the call. In many instances the calling party is then placed on hold, while the attendant returns to an earlier received call. The length of time that the calling party must wait before reaching the desired number may be a source of aggravation to a potential customer — for example, a businessman attempting to make a reservation at a motel. In other instances, a call of an emergency nature is delayed. In such PABX telephone systems, it would be desirable to have provision for automatic routing of the incoming call to a free predesignated telephone line which could be answered — for example, by a room clerk who could then give the desired assistance to the caller.

With PABX telephone systems, all of the operator positions may be unattended at night. In the prior art systems in such circumstances, a night switchover is made and all incoming calls are automatically translated to a predetermined telephone set at the PABX. Generally, the designation of the set may not be readily changed. If a business has only one or a small number of security guards making rounds, calls may not be answered. Furthermore, in such systems only one call at a time may be handled at night. If the designated line is busy, callers are forced to retry their calls. Depending on the length of time that the designated line is busy, the callers may become annoyed or call a competing business (e.g., a motel). Therefore, it would be desirable in systems where trunks are answered by the operator to include provision for changing the designation of the night line and for permitting incoming night calls to be connected to additional lines if the normal night line is busy.

A number of businesses have a plurality of PABX systems each in a different location. For such businesses it may be desirable to provide for answering of incoming night calls to all such locations, but unnecessary from a securing standpoint and uneconomical to station employees at each location. Therefore, it would be desirable to include provision in such systems for routing of all night calls to a central location, thereby requiring only one night attendant.

Accordingly, it is an object of the present invention to provide a novel and improved universal answer arrangement for use with PABX telephone systems.

Another object of the invention is to provide such an arrangement which permits all night calls to be automatically routed to a predetermined telephone line, the designation of which is easily alterable.

Still another object of the present invention is to provide such an arrangement which provides for operator type supervision of night calls.

A further object of the invention is to provide such an arrangement which does not provide answer supervision until the designated line circuit goes off hook and which permits the incoming calls to be routed to a free designated line if a first designated line is busy.

Another object of the invention is to provide such an arrangement which permits routing of incoming night calls to another PABX in the event that all designated local night lines are busy or the incoming PABX location is unattended.

A further object of the invention is to provide such an arrangement which permits calls to be routed to different destinations depending on their origin or connected group of incoming trunks by means of alterable program application.

BRIEF DESCRIPTION OF THE DRAWINGS

Other objects, features and advantages of the invention will become apparent from the following description of a particular embodiment, taken together with the attached drawings thereof in which.

DESCRIPTION OF A PARTICULAR EMBODIMENT

In order to facilitate an understanding of the various principles of the present invention, reference is made in the following disclosure to a typical private automatic branch exchange of the type to which the present invention is applicable. The details of the referenced PABX are set forth in copending application Ser. No. 293,518, filed Sept. 29, 1972, by Uwe A. Pommerening, Klaus Gueldenpfennig and Stanley L. Russell, now U.S. Pat. No. 3,859,474, which is assigned to the same assignee as the present invention. However, it should be apparent from the following disclosure that the present invention is generally applicable to any private branch exchange in which the operator answers trunks and obtains access to a line circuit.

GENERAL SYSTEM DESCRIPTION

Figure 1:
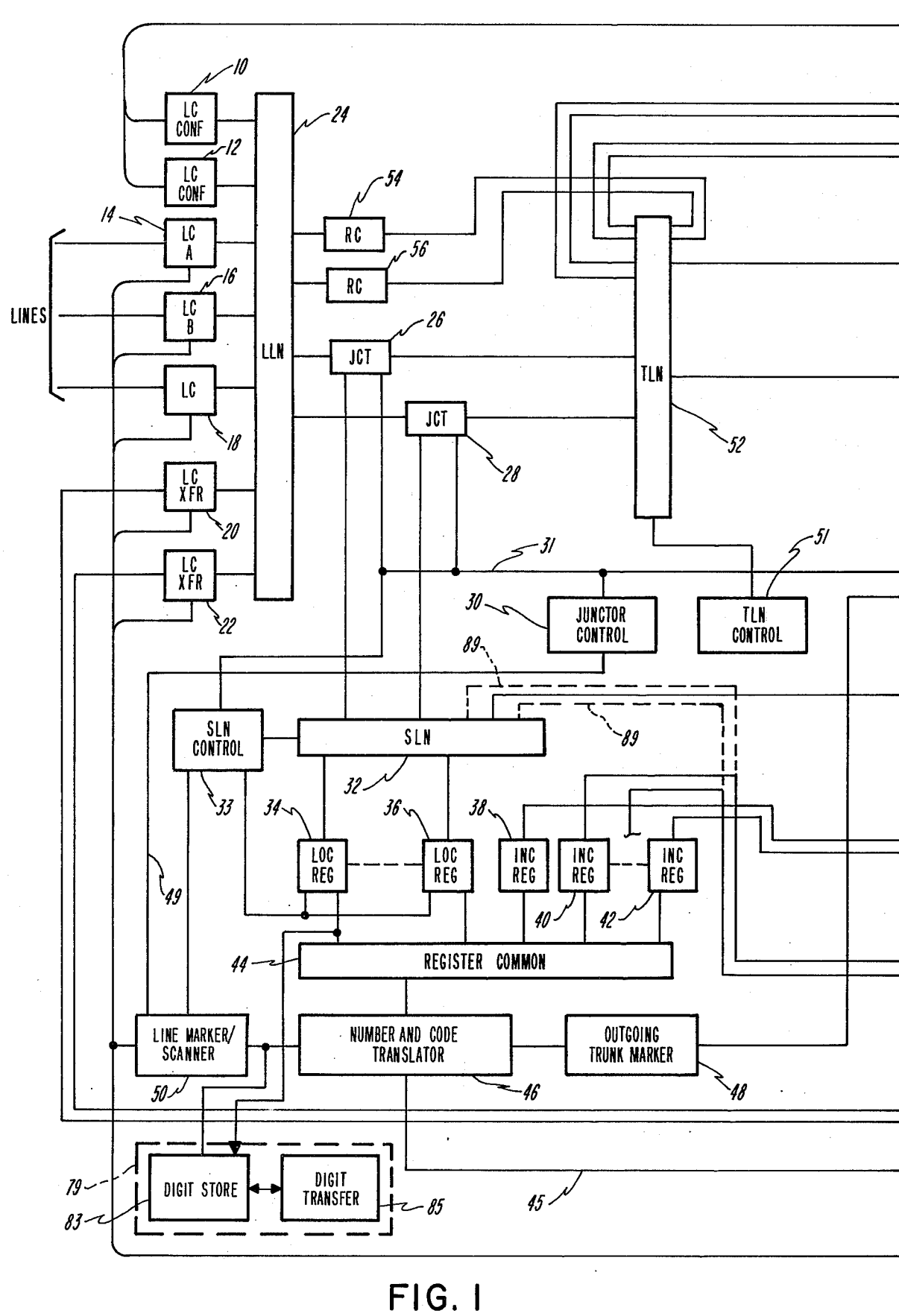
FIGS. 1–3, when combined in numerical order, provide a schematic block diagram of a private automatic branch exchange including the present invention.
Figure 2:
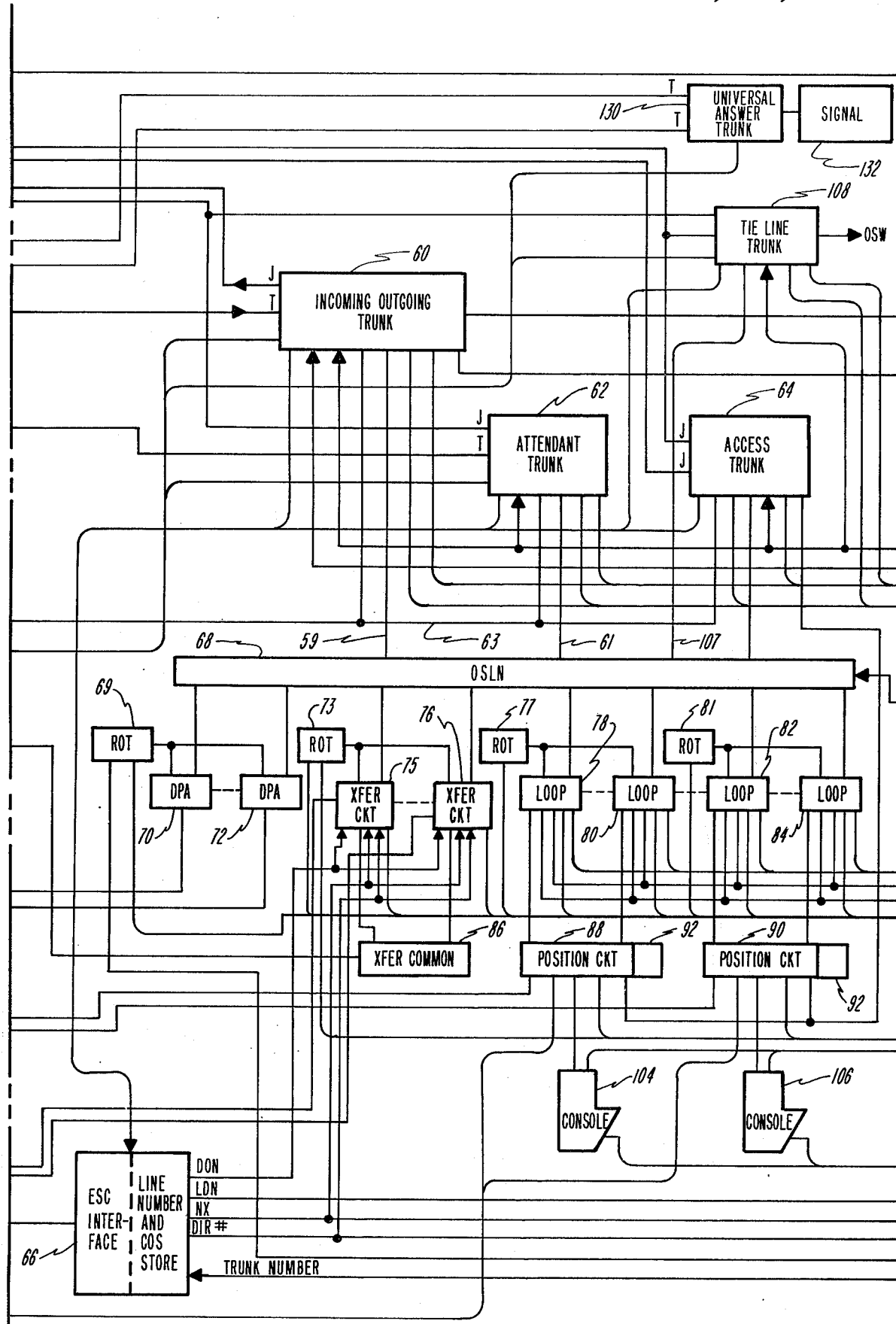
Figure 3:
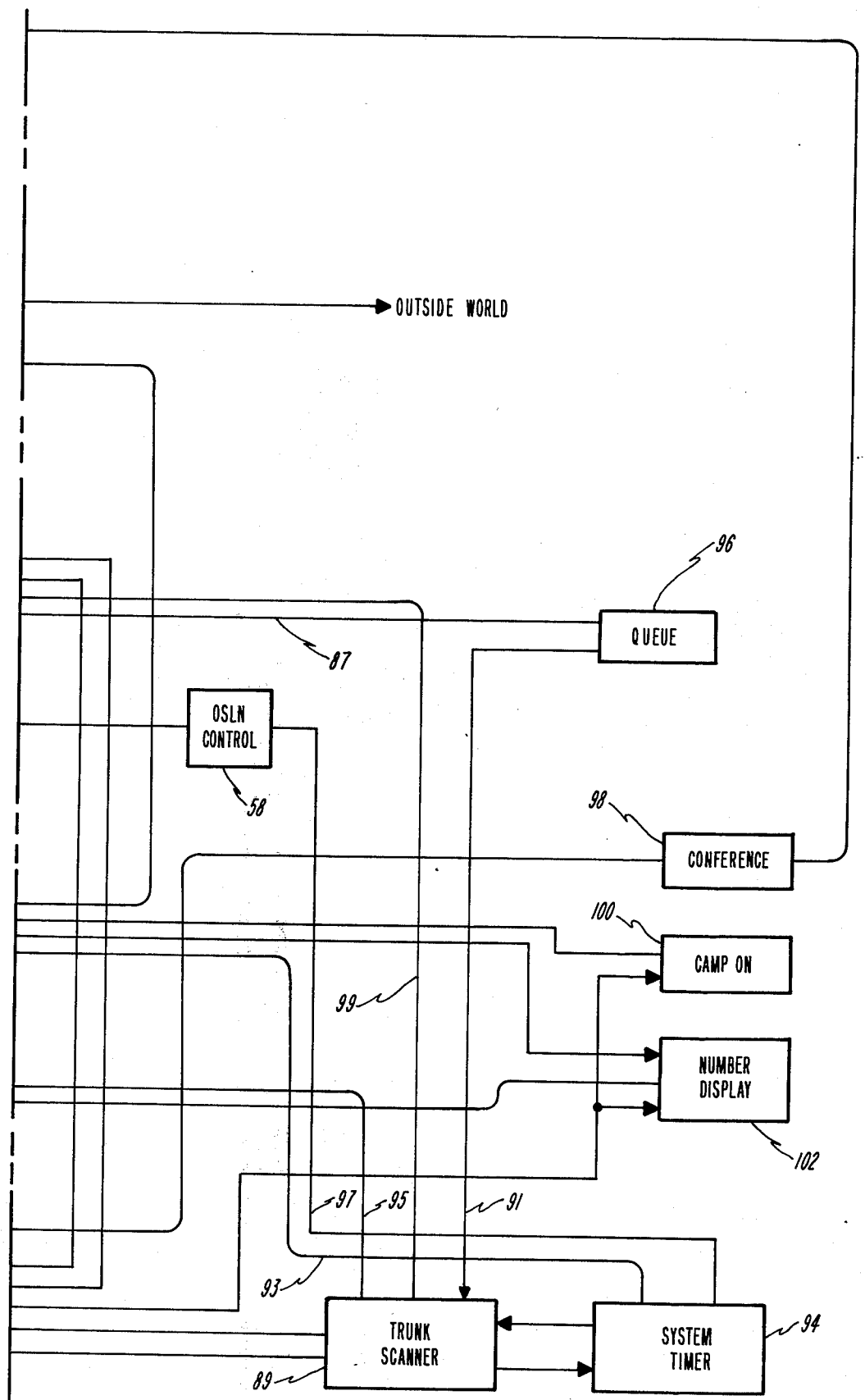

It will be seen from the drawings that FIG. 1 represents that portion of the system which relates to an electronic switching central; while, FIGS. 2 and 3 provide equipment which forms part of a private branch exchange.

Looking first to the portion of the system illustrated in FIG. 1, which provides the electronic switching center (ESC) equipment, there is included a line link network (LLN) 24 which functions as a concentrator for originating line calls and a fan out for terminating calls. The LLN consists of two stages of matrices, for example, and is used for both originating and terminating types of traffic. One end of the LLN is connected to a plurality of line circuits, such as the conference line circuits 10 and 12, typical subscriber line circuits 14, 16, 18, and transfer line circuits 20 and 22. The typical subscriber line circuits 14, 16, and 18 are more fully described in copending U.S. Pat. No. 3,708,627, issued on Dec. 5, 1972, in the name of Otto Altenburger, which is assigned to the same assignee as the present invention.

The line link network 24 provides one unique path between circuits connected to opposite ends of the network. Each of the switching networks in FIG. 1 includes matrix switches comprises of relays including a mark or control winding for initially actuating the relay and a hold or sleeve coil connected in series with its own contacts for maintaining the relay in the actuated state after a path through the network has been established. The last stage of the line link network 24 provides a termination for both originating traffic from the line circuits and incoming traffic to the line circuits. The terminating paths through the line link network to a line circuit are unique paths so that no path-finding need be performed between the ringing controls 54 and 56 and a line circuit through the line link network.

The terminations for the originating paths through the line link network are connected to one of a plurality of junctors, such as junctors 26 and 28. The ringing controls are more fully described in U.S. Pat. No. 3,671,678, issued on June 20, 1972, in the name of Otto Altenburger, which is assigned to the same assignee as the present invention. The junctor circuits 26 and 28 and the junctor control circuit 30 are more fully described in copending U.S. Pat. No. 3,705,268, issued on Dec. 5, 1972, in the name of Otto Altenburger, which application is assigned to the same assignee as the present invention.

The junctors 26 and 28 serve as the focal points for all local originating traffic. The junctors include provisions for connecting the line circuits to the local registers 34 and 36 via a service link network (SLN) 32, and for providing transmission battery for calling and called parties on intraoffice calls. The junctors are under the control of the calling party. When trunk or station busy conditions are encountered, the junctors provide the busy tone to the calling party.

The service link network 32 includes two stages of matrices (P and S) and is controlled by a SLN control circuit 33 for connecting the calling line circuit via one of the junctors to one of a plurality of local registers. The local registers, when connected to the junctors, provide dial tone and include apparatus for acting on the subscriber instructions. The junctors terminate on the P stage and the dial pulse acceptors (not shown) in the local registers terminate at the S stage of the service link network. The local registers include dial pulse acceptors which provide the dial tone to the calling subscriber, detect rotary dial pulses and extend the pulses to storage sections in the local registers.

The local registers also comprise a register storage and register output and a sender for providing outpulsing. The registers and senders are controlled by a register common 44 which contains the necessary control units. The local registers are connected to the register common 44 on a time division multiplex basis wherein information is passed from one equipment to another on a common bus basis. The register common 44 is also connected to communicate with a number and code translator 46 on a time division multiplex basis. The translation circuit provides information such as equipment number, ringing codes and class of service. The number and code translator 46 is connected to the line scanner-marker circuit 50 which has the means to detect service requests and means to access the individual line circuits.

The ringing controls 54 and 56 connect ringing generators to terminating or called stations, detect off-hook conditions (ring-trip) of the called station, and provide ring-back tone for the calling station. Each line circuit can be connected to any of a plurality of ringing controls which are accessed from a trunk link network (TLN) 52 so that a ringing control is automatically connected to the terminating line circuit as soon as a connection to that line is complete.

A line scanner and marker circuit 50 continuously checks the line circuits for an off-hook condition and is used for both originating and terminating types of traffic. In the event of originating traffic, the line scanner stops when an off-hook condition is detected and transmits the information from its counter circuits to a marker circuit to mark the particular line circuit and enables the SLN control 33 to initiate a pathfinding operation between an available local register and the line circuit requesting service. In the event of terminating traffic, the line scanner is controlled by the number and code translator 46 so as to receive an equipment number from the translator to mark the line circuit with the particular equipment location. Furthermore, in terminating traffic, the line marker is also involved in transmitting the terminating subscriber classes of service, ringing code, busy or idle status, and types of ringing required throughout the junctor control 84 to the ringing control 34. The line scanner-marker circuit 50 is more fully described in copending U.S. Pat. No. 3,699,263, issued on Oct. 17, 1972, in the names of Gunter Neumeier and Otto Altenburger, which is assigned to the same assignee as the present invention.

The trunk line network (TLN) 52 provides for the termination of the local traffic to local subscribers, the termination of incoming calls from other exchanges to the local subscriber, and for the connection of incoming calls from other exchanges to other external exchanges. The TLN 52 includes a three-stage network. When further expansion is necessary, another stage can also be included. A D stage of the matrix is the entrance to the TLN and is connected to the local junctors 26 and 28. An F stage is the output or exit of the TLN and is connected via the ringing controls to the line link network 24 and also to the trunk circuits.

Path finding through the trunk line network 52 is performed under the control of the TLN control 51 and the junctor control 30. The TLN control 51 and the junctor control 30 work together in completing the termination portion of a call, whether it is an internally terminated call or an outgoing call to a distant office. The number and code translator 46 and line scanner-marker 50 are used to complete calls to local lines, and the number-code translator together with the outgoing trunk marker 48 complete calls to the trunks. The outgoing trunk marker is more fully disclosed in U.S. Pat. No. 3,732,377, issued on May 8, 1973, in the names of Otto Altenburger and David Stoddard, and is assigned to the same assignee as the present invention.

The pathfinding scheme of the TLN control 51 includes a two-step scan. The junctor has been previously marked, and furthermore, the information in the local registers is transmitted via the register common 44 to the number-code translator 46 at this time. In the event of a call terminating to a local subscriber, the number-code translator via the line scanner-marker circuit marks the line circuit of the terminating call. In the event of an outgoing call, the number-code translator via the outgoing trunk marker circuit marks the particular trunk circuit. The path-finding sequences through the SLN and the TLN along with the equipment associated therewith are more fully described in U.S. Pat. No. 3,729,523, issued on Apr. 24, 1973, in the names of Otto Altenburger and Robert Bansemir, which application is assigned to the same assignee as the present invention.

Looking now to the portion of the system illustrated in FIGS. 2 and 3, which includes the (PBX) private branch exchange portion, five types of trunk circuits may be provided in the telephone system; however, only an incoming/outgoing trunk 60 providing direct inward and direct outward dialing and which when receiving the listed number will terminate at an operator, an attendant trunk 62, an access trunk 64 and a tie-line trunk 108 providing a direct connection to another commonly-owned PABX are illustrated. The access trunks 64 are used solely by the operators to originate calls to the subscriber stations; while the attendant trunks 62 are used by the local stations for access to the operator, from which they can be extended to another trunk or local station. The incoming-/outgoing trunks 60 interface the telephone exchange with distant offices. Each of the incoming/outgoing trunks 60, the attendant trunks 62 and the tie-line trunks 108 have port appearances at both the originating and terminating ends of the trunk link network 52, while the access trunks 64 have two line port appearances only on the originating ends of the trunk link network. The outgoing trunk marker 48 is connected to each of the incoming/outgoing trunks 60, the attendant trunks 62 and the tie-line trunks 108 and serves to select a trunk circuit for a call originated by one of the local subscribers in response to the dialed digits as analyzed by the number and code translator 46.

An operator service link network (OSLN) 68 controlled by an OSLN control 58 is provided for connecting the trunks 60, 62, and 64 to various service circuits such as the dial pulse acceptors 72–74, transfer circuits 74–76, and loop circuits 78–84. The operation of the OSLN 68 and the OSLN control 58 and the method of signaling through the OSLN is fully described in two U.S. Patents entitled, "Path Finding System," U.S. Pat. No. 3,729,592, issued on Apr. 24, 1973, in the names of Klaus Gueldenpfennig and Stanley L. Russell; and entitled, "Telephone Switching Netowrk Signalling System," issued on Dec. 26, 1972, U.S. Pat. No. 3,816,665, in the names of Klaus Gueldenpfennig, Stanley L. Russell and Uwe A. Pommerening, both of which are assigned to the same assignee as the present invention.

The loop circuits 78–84 are separated into two groups 78–80 and 82–84, the former being connected to an operator console 104 via a position circuit 88 and the latter being connected to another operator console 106 via a position circuit 90. The loop circuit groups 78–80 and 82–84 are associated with rotaries 77 and 81, respectively, which serve to preselect an available loop for connection to the associated position circuit in preparation for a request for connection from a trunk to the operator console via its associated position circuit through the OSLN 68.

The position circuits 88 and 90 are connected to the system timer forming part of the common control for the PBX portion of the system, and the position circuits also are directly connected to a dedicated incoming register, such as 40 and 42, associated with the register common 44 and number and code translator 46 in the ESC portion of the system. If it is not desired to avoid dedicating registers to any single piece of equipment as in the foregoing manner, then alternatively the position circuits 88 and 90 can be connected to the local registers such as 34 and 36 through the SLN 32 as indicated in FIG. 1 by the dashed lines. The connection of any of the trunks to any of the service circuit groups is fully disclosed in U.S. Pat. No. 3,769,462, entitled "Private Automatic Branch Exchange Circuit Complex," issued on Oct. 30, 1973, in the names of Klaus Gueldenpfennig, Stanley L. Russell and Uwe A. Pommerening, and assigned to the assignee of the present invention. The operation of the position and loop circuits is fully disclosed in U.S. Pat. No. 3,816,665, entitled, "Operator Loop Complex," issued on June 11, 1974, in the names of Klaus Gueldenpfennig, Stanley L. Russell and Uwe A. Pommerening, and assigned to the assignee of the present invention, and the structural details of which are herein incorporated by reference.

The incoming/outgoing trunk circuit 60 may also be connected through the OSLN to one of several dial pulse acceptors 72–74, which, although shown separately for convenience, form part of the dedicated incoming registers 38–40, respectively. The dial pulse acceptors 72–74 are also preselected by a rotary 69 for connection through the OSLN 68 to a trunk upon request for service and are accessed by the trunk scanner 89 via the rotary 69.

The incoming/outgoing trunks 60 may also be connected through the OSLN 68 to transfer circuits such as 75–76, which are connected, respectively, to a dedicated transfer line circuit 20–22 at the input of the line link network 24. The transfer circuits are also preselected by a rotary 73 in preparation for a request for connection through the OSLN 68 to a universal trunk 60. The transfer operation includes the use of a transfer common 86 which is connected to the transfer circuits 75 and 76 and has a dedicated input to the service link network 32 for obtaining access to a local register 34–36. The transfer circuits and transfer common 86 are also connected to the system timer 94 and trunk schanner 89 via the rotary 73. The operation of the transfer circuit and transfer common is fully disclosed in U.S. Pat. No. 3,806,661, entitled "Transfer Circuit," issued on Apr. 23, 1974, in the names of Klaus Gueldenpfennig, Stanley L. Russell and Uwe A. Pommerening, and assigned to the assignee of the present invention.

A queue 96 is provided in association with the universal trunks 60 and attendant trunks 62 to provide for servicing of requests for the operator on a first-come, first-served basis. The operation of the queue 96 is fully described in U.S. Pat. No. 3,702,380, entitled, "Queue For Electronic Telephone Exchange", issued on Nov. 7, 1972, in the names of Klaus Gueldenpfennig, Stanley L. Russell and Uwe A. Pommerening and assigned to the same assignee as the present invention. The queue 96 is connected between each of the universal and attendant trunks and the trunk scanner 89 and serves to forward the trunk scanner 89 the request for operator signals as they appear at the output of the queue in conjunction with the scanning of the particular trunk by the trunk scanner 89. The trunk scanner 89 scans each of the incoming/outgoing trunks 60, attendant trunks 62, and access trunks 64 in sequential order and is stopped in its scanning on a particular trunk upon receiving a request for service signal in connection with that trunk. The request for service signal may relate to a request for a loop circuit to access an operator, a request for a transfer circuit, or the request for a DPA in connection with a direct inward dialed call. If a requested service circuit is available when the request is received in the trunk scanner 89, a stop scan signal will be generated and the request for service signal will be forwarded to the service circuit.

The system timer 94 scans each of the operator position circuits and transfer circuits in sequential order simultaneously with the more rapid scanning of the dial pulse acceptors 70 and 72. The system timer 94 generates a plurality of time slot signals OPTS1-OPTSN, each of which, for example, may be of ten millisecond duration. Each of the operator position circuits, transfer circuits and various special circuits are assigned one of the operator time slots so that these circuits are scanned in the sequence in which the time slots are generated by the system timer. Time slot signals LBTS1-LBTS10 are also generated by the system timer for use in signaling and for timing the various operations to be performed during each operator time slot. Thus, each operator time slot OPTS is made up of ten time slots LBTS1-LBTS10. When a stop scan signal has been generated in the trunk scanner 89 and a request for service signal has been forwarded to the circuits of the type requested, the first circuit preselected by the rotary which is scanned by the system timer 94 will be seized and connection through the OSLN 68 from the trunk to the selected circuit will be effected.

The system may also provide for various special features circuits, including the universal answer arrangement 92 of the present invention, a conference system 98, and a camp-on system 100. The camp-on system is disclosed in our U.S. Pat. Nos. 3,676,606 are 3,679,835, both being assigned to the same assignee as the present invention.

As is quite well known, an electronic switching central of the type described in connection with FIG. 1 services requests from subscriber stations and connections from the outside world to subscribers within the system by common control equipment which functions on the basis of detected conditions; accordingly, in such a system, once a connection has been established from or to a subscriber station through the system, the common control equipment releases to leave only the communication connection. However, the PBX portion of the system and its various special features circuits require certain information concerning the communication connection, such as the calling and called line circuit directory numbers, the class of service of the various parties involved and the numbers of the trunks which may be involved in the call. This type of information is not retained by the ESC portion of the system once the connection through that portion of the system is completed and so the system provides a PBX-ESC interface and line number store 66 which receives information concerning the subscriber line circuits and the class of service of these circuits at the time the connection through the ESC is effected so that this information may be received and stored in the PBX portion of the system for further use in connection with the special services features. For example, each time a trunk is marked for connection to a subscriber station, the data concerning the subscriber station, including the directory number and class of service thereof, will be forwarded via line 45 to the PBX-ESC interface and line number store 66 for storage therein or for transfer into the trunk circuit itself. For example, the transfer class of service will be forwarded to the trunk circuit upon connection thereof to the subscriber station by enabling of the NX data but from the store 66 each time a connection to a trunk is effected.

A group hunting circuit 79, including a digit store circuit 83 and a digit transfer circuit 85, is also provided in the PABX. As will be explained in greater detail below, the universal answer arrangement of the present invention may be programmed to direct incoming calls to the pilot number of multi-line line circuits. If the pilot number of the hunting group is called and found to be busy, the hunting equipment automatically hunts through the other lines of the group sequentially until it finds an idle line. Typically, when the pilot number is called, the digits of the pilot number are stored in a register, for example local register 34, and are subsequently delivered to the digit store circuit 83. After the register 34 has requested service from the common control, a class of service check is made and, if the digits are associated with a group hunting sequence, the group hunting class of service is specified and group hunting is initiated. The group hunting circuit 70, in which the digit store circuit 83 provides for consecutive hunting of lines and the digit transfer circuit 85 provides for non-consecutive hunting, is described in detail in U.S. Pat. No. 3,723,659, which issued on March 27, 1973, in the names of Ignas Budrys and Ernest O. Lee, Jr., and is assigned to the same assignee as the present invention.

Figure 4:
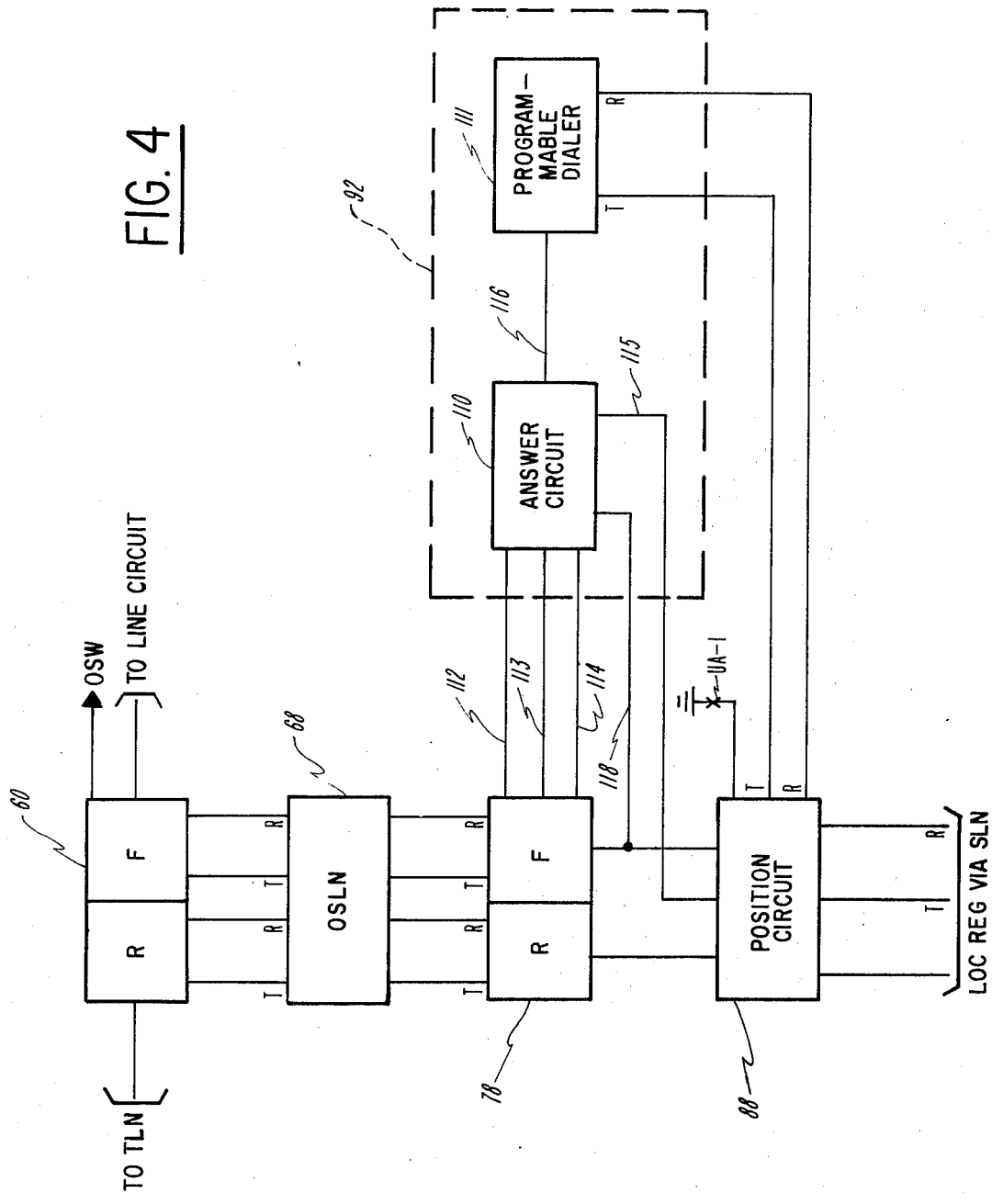
FIG. 4 is an expanded block diagram of a universal answer arrangement constructed in accordance with the present invention, together with associated circuits.

Referring now to FIG. 4, there is shown an expanded block diagram of a universal answer service circuit 92 including an answer circuit 110 and programmable dialer circuit 111. An incoming call to the PABX is connected to the front port of an incoming trunk 60. The tip and ring leads in the front port of the incoming trunk 60 are then connected via the OSLN 68 to the tip and ring leads of the front port of operator loop circuit 78, for example. When all of the operator position circuits are unattended and the universal answer arrangement for the position circuit 88 has been switched on, normally open contacts UA-1 will be closed providing a ground signal to the position circuit 88. As will be explained in greater detail below, the ground signal overrides the all operators busy indication to the common control and enables the position circuit 88 to automatically answer calls. The calling party receives ringback tone from the central office or the trunk 60. The incoming call at the operator loop circuit 78 is connected in the conventional manner to the position circuit 88. When the call is connected to the position circuit 88, the answer circuit 110 transmits via line 112 an answer (ANS) signal to the loop circuit 78 energizing a relay (not shown) in the loop circuit 78 which returns an LA signal to the answer circuit 110 via a line 113. The answer circuit 110 also transmits an inhibit answer supervision signal INH to the loop circuit 78 via a line 114 and, after a slight delay, a start (ST) signal is transmitted via a line 115, the position circuit 88 and the SLN to connect a local register to the position circuit 88 in the conventional manner. When a sleeve (SLR) signal is received from the local register by the position circuit 88, a start (ST) signal is transmitted by the answer circuit 110 to the programmable dialer circuit 111 via a line 116.

At a fixed time interval following receipt of the ST signal, the programmable dialer circuit 111 transmits the programmed designated line, trunk or routing member to the tip and ring lines of the position circuit 88. The designated number is then sent via the tip and ring lines of the position circuit 88 and the SLN 32 to a local register 34 or 36. The position circuit 88 receives a SWMK signal from the local register when the local register has received all the digits transmitted from the automatic dialer circuit 111. The local register than transfers the digits stored therein to the common control and the SWMK signal which is also transmitted via the position circuit 88 to the loop circuit 78 and incoming trunk 60 then effects a connection from the rear port of the incoming trunk 60 to the designated line circuit or trunk. The answer circuit 110 provides a signal (LRC) via a line 118 which prepares the loop 78 for the release sequence. The loop 78 provides a ringing signal to the connected line. When the line answers (or in the case of a trunk, the ultimate connection has been completed), the OSLN 68, operator loop 78, and position circuit are released from the call in the conventional manner.

A connection is now made between the front and rear ports of the incoming trunk 60. The loop circuit performs its usual functions of ringing and busy monitoring the connection until the called line goes off hook.

The PABX is also provided with a universal answer trunk 130 (FIG. 2) which has two ports connected to the (output) H-stage of the TLN 52 and which, when the automatic dialer circuit 111 is programmed to direct incoming calls thereto, is arranged to have an incoming call connected to one of its ports and to energize a signaling device 132, such as a bell or chimes when all of the operator position circuits 88 are unattended and at least one is connected to provide the universal answer arrangement. Such a signalling device should advantageously be located where it would be audible to individuals present in the PABX facility — for example, at night. One of the individuals may then go to any line circuit and dial a code, which is transmitted to the trunk marker and designates the address of the second port of the universal answer trunk 130. The line circuit is then connected to the second port, a connection is then effected between the two ports (as will be explained in greater detail hereinafter) and the individuals at the PABX facility answers the incoming call.

Figure 5:
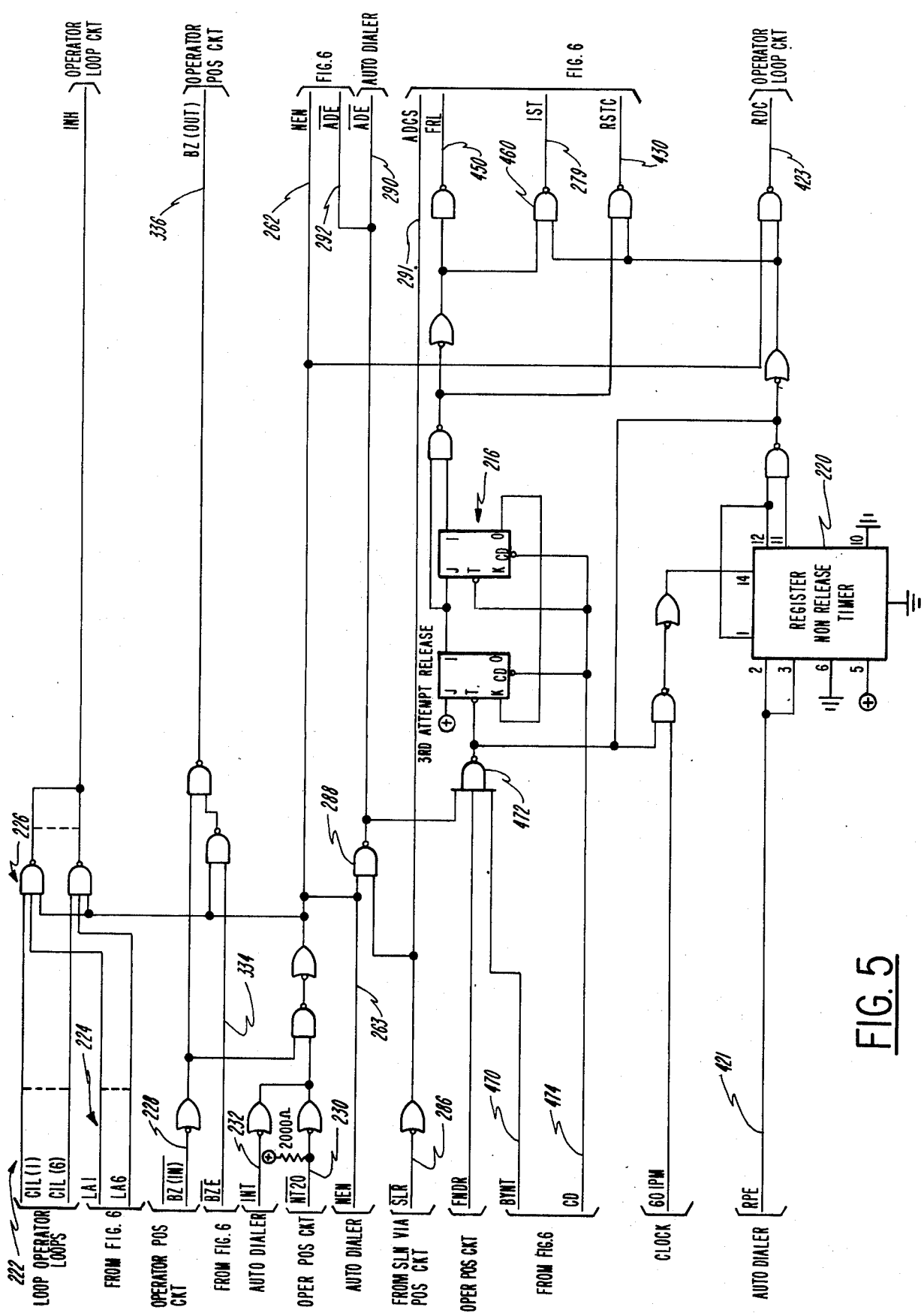
FIGS. 5 and 6 are electrical schematic wiring diagrams of the answer circuit shown in FIG. 4.
Figure 6:
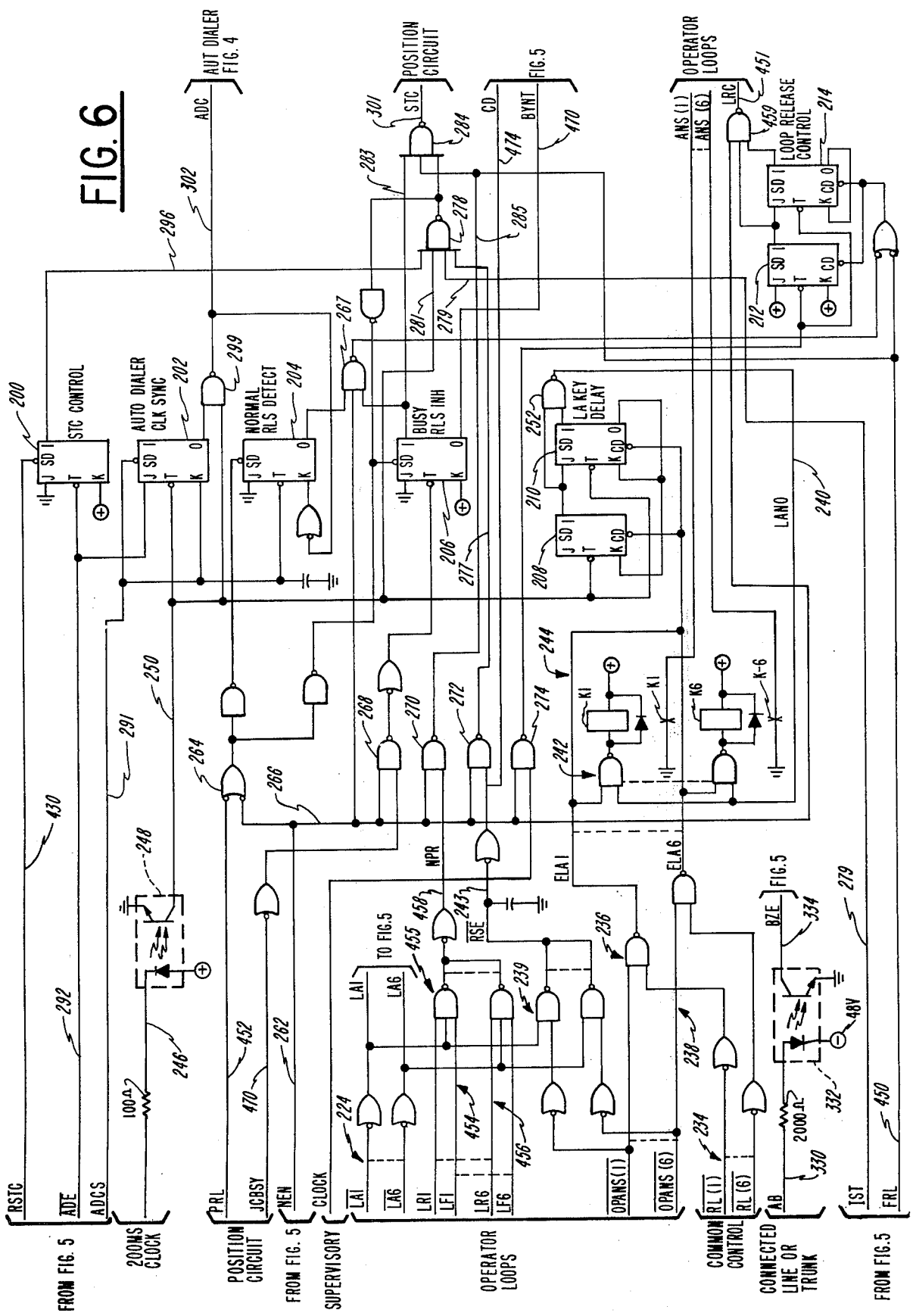

FIGS. 5 and 6 illustrate the electrical schematic wiring diagram of the universal answer circuit 110 (arranged, for example, for connection to six operator loop circuits 78 and operator position circuit 88) shown in block diagram form in FIG. 4. The detailed construction and operation of the answer circuit 110 will be described below; however, first a general description of the answer circuit 110 will be given. The answer circuit 110 includes a start clock control flip-flop 200, which permits the operator position circuit 88 to simulate a start key function in order to be connected to a register if the night answer arrangement is switched on and the position circuit is not already connected to a local register. An auto dialer clock sync flip-flop 202 is provided and synchronizes the operation of the programmable or automatic dealer circuit 111. Also included are a normal release detect flip-flop 204, which detects the normal release of a seized local register 34 after the universal answer arrangement has completed a connection to a designated line or trunk, and a busy release inhibit flip-flop 206, which inhibits the handling of a new incoming call while an attempt is being made to complete a call previously received in the operator loop circuit 78. LA key delay flip-flops 208 and 210 are provided in the answer circuit 110 and provide a pre-determined time delay following the simulated switching of the operator answer key before the relay which was operated to simulate the answer key is released.

The answer circuit 110 also includes loop release control flip-flops 212 and 214 which control the transmittal of a loop release (LRC) signal to the operator position circuit 88. The LRC signal prepares the position circuit 88, the loop circuit 78 and the OSLN 68 to be released from the call following receipt of answer supervision from the designated line circuit or trunk.

A two bit counter (third attempt release circuit) 216 and a register non-release timer circuit 220 (FIG. 6) are also included in the answer circuit 110. The two bit counter 216 permits the universal answer arrangement to make three attempts to connect the incoming call via a seized local register 34, while the register non-release timer circuit 220 provides a signal to the operator loop circuit for releasing the register in the conventional manner after each attempt to complete a call to the designated number.

When an incoming call is connected to an operator loop 78, a CIL high signal is transmitted via a line 222 (correponding to the particular operator loop 78 in service). When the operator loop 78 has been connected to the incoming trunk 60 an $\overline{RL}$ signal is transmitted from the particular operator loop 78 via the corresponding one of lines 234, is inverted and enables one input of the corresponding one of a plurality of AND gates 236. If the particular loop circuit 78 has not answered the incoming call, an OPANS (high) signal is present on a corresponding line 238 which is connected to the other input of the same AND gate 236. A LANO high signal is present on a line 240 either initially or following the simulation of the answer key from a preceding call utilizing the universal answer arrangement. The high output of the particular AND gate 236 together with the LANO signal are ANDED in the particular AND gate 242 corresponding to the connected operator loop circuit 78. The output of the AND gate 242 energizes an associated relay KN which closes an associated normally open contact pair K-N, which in turn transmits a ground answer signal (ANS) via a line 241 to the operator loop circuit 78. This ground signal simulates the switching of the operator answer key in the operator position circuit 88.

At the same time that the output of the particular AND gate 236 to which the OPANS and RL signals have been transmitted goes high, an ELA signal is transmitted via the corresponding one of a plurality of lines 244 and resets the LA key delay flip-flops 208 and 210. A 200 millisecond clock pulse is applied via a line 246 to an optoelectronic isolator 248 including a light emitting diode and a phototransistor, connected as shown, and the output of the optoelectronic isolator 248 is transmitted via a line 250 to the toggle inputs of the LA key delay flip-flops 208 and 210. The "one" outputs of the flip-flops 208 and 210 are connected to the inputs of an AND gate 252 and, after a 600 millisecond delay, the AND gate 252 is enabled and the LANO signal goes low, disabling the particular AND gate 242 which previously energized the relay KN. The associated contact pair K-N opens, removing the simulated operator answer key signal from the particular operator loop circuit 78. The loop circuit 78 then returns an $\overline{LA}$ signal to the answer circuit 110. The $\overline{LA}$ signal is transmitted via the corresponding one of lines 224 and is inverted and "ANDED" with the CIL signal in a corresponding AND gate 226. When the particular position circuit 88 having the universal answer arrangement is unattended, it is marked busy and a $\overline{BZ(in)}$ signal is present on a line 228. Assuming the universal arrangement 92 has been switched on, an $\overline{NT20}$ signal is transmitted from the operator position circuit via a line 230. If, in addition, the automatic dialer circuit 110 is connected into the arrangement, an INT signal is present on a line 232 and the particular AND gate 226 having the CIL and LA high inputs transmitted thereto is enabled and an inhibit answer supervision (INH) signal is transmitted to the operator loop circuit 78. The INH signal prevents the loop circuit from returning answer supervision until the designated line circuit goes off hook or the call is terminated through a trunk.

After the simulated loop answer signal, the OPANS signal on the corresponding line 238 goes low, is inverted and is transmitted to one input of the corresponding one of a plurality of AND gates 239. The corresponding LA signal (on a line 224) is transmitted to the other input of the AND gate 239, which is enabled and has a register seize enable $(\overline{RSE})$ output via a line 243 to one input of an AND gate 272. When the $\overline{BZ(in)}$, INT and $\overline{NT20}$ signals present, respectively, on lines 228, 232, and 230, an NEN (enable) signal is transmitted via a line 262 to one input of an OR gate 264, via a line 263 to the automatic dialer circuit 110 and via a line 266 to one input each of ND gates 268, 270, 272 and 274 to enable the operation of the answer circuit 110.

The AND gate 272 is enabled by the coincidence of RSE and NEN and transmits a high signal to one input of an AND gate 278 via a line 227.

If the particular operator loop circuit 78 is not connected to a local register 34, the output of the STC control flip-flop 200 on line 296 is high. High signals are also present on lines 279 and 281 and the AND gate 278 is enabled.

The output signal of the busy release inhibit flip-flop 206 transmitted via a line 283 to one input of an AND gate 284 is high, as is the output signal of the AND gate 270 which is transmitted via a line 285 to another input to the AND gate 284. The AND gate 284 is enabled and transmits a start (STC) signal via a line 301 to the operator position circuit 88 which starts the sequence to connect the position circuit 88 to a local register 34 in the conventional manner.

When the local register 34 has been connected a $\overline{SLR}$ signal is transmitted from the SLN and the position circuit 88 to the answer circuit via a line 286. The $\overline{SLR}$ signal is inverted and enables an AND gate 288 which transmits an auto dialer enable ($\overline{ADE}$) signal via a line 290 to the automatic dialer circuit 111, enabling the dialer circuit, and via a line 292 to toggle the STC control flip-flop 200 and disable the AND gates 278 and 284 and to enable the auto dialer clock sync flip-flop 202. The inverted $\overline{SLR}$ signal (ADCS) is transmitted via a line 291 and also enables the auto dialer clock sync flip-flop 202. The high output of the flip-flop 202 permits 200 millisecond clock pulses transmitted via an optoelectronic isolator 248 to bypass the flip-flop 202 (via an AND gate 299) and to be transmitted as ADC signals via a line 302 to the automatic dialer circuit 111 to operate a decade counter.

Figure 7:
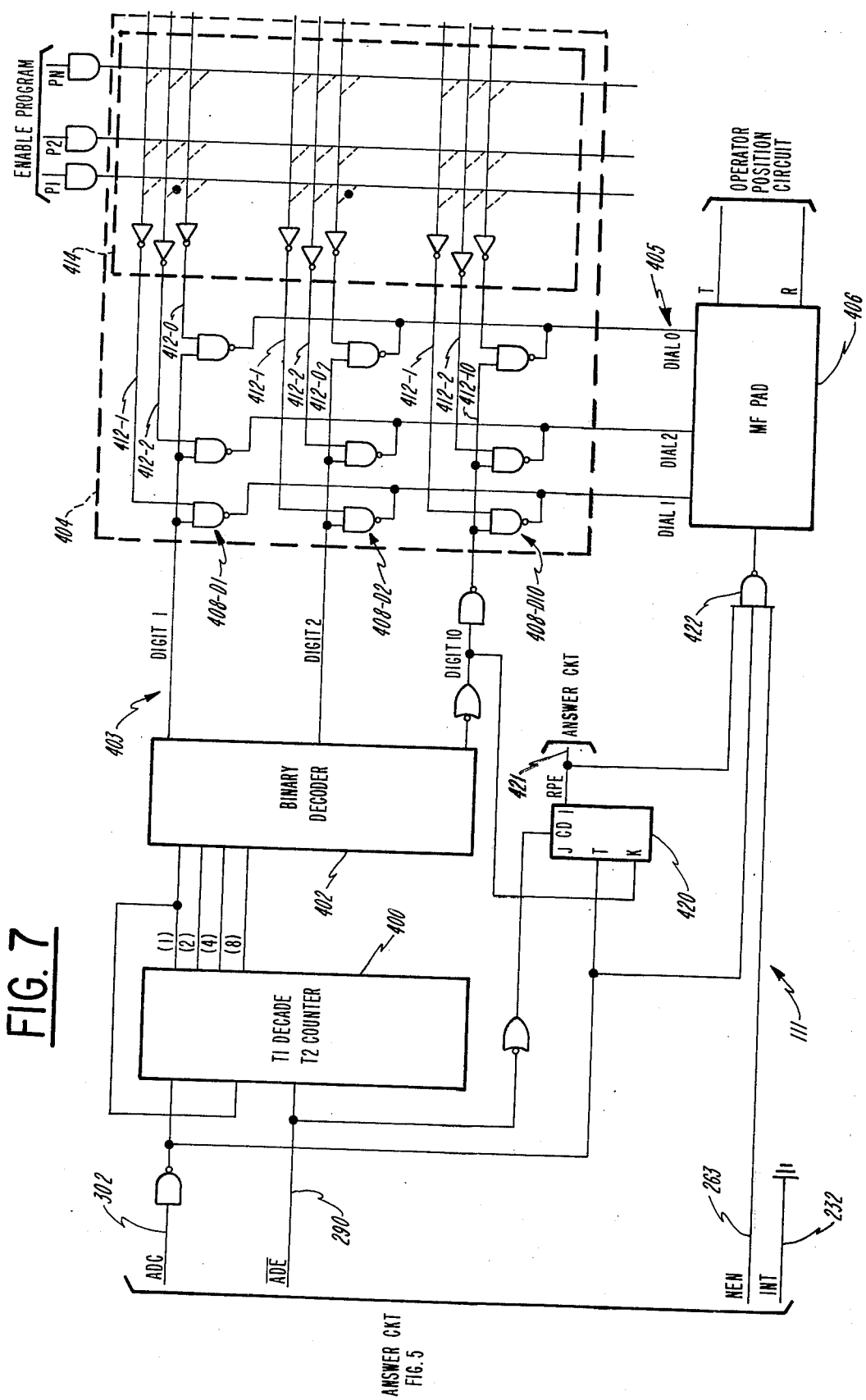
FIG. 7 is an expanded diagram, partially in schematic form and partially in block diagram form of the programmable dialer circuit shown in FIG. 4.

Referring now to FIG. 7, there is shown a diagram, partially in electrical schematic form and partially in block diagram form, of the automatic dialer circuit 111. The automatic dialer circuit 111 includes a decade counter 400 and a binary to decimal decoder 402. The decade counter 400 is enabled by the $\overline{ADE}$ signal transmitted via line 290 and is operated by the successive ADC pulses transmitted via the line 302. The decade counter 400 provides a binary count from zero to nine and the binary count is decoded in the binary decoder which provides decimal outputs (Digit 1 through Digit 10), which are transmitted via lines 403 from a program matric 404.

The program matrix 404 is arranged to convert the decimal outputs of the binary decoder 402 to a programmable sequence of digits (Dial 1 through Dial 0) which may represent, for example, a designated line circuit for all incoming calls, a universal answer trunk 130, a tie line trunk 108, the pilot number of a hunting group which may be accessed under the control of the group hunting circuit 79, or particular line circuits corresponding, respectively, to particular groups of incoming trunks 60 into which incoming calls are connected. The dial digits are transmitted via lines 405 to a standard MF pad 406 which is arranged to convert the DC signals into two-out-of-seven multifrequency signals for transmission to the tip and ring lines of the operator position circuit 88 and thereafter via the SLN 32 to the seized local register 34.

In the simplest case, in which all incoming calls are to be directed to a single pre-determined line circuit, hunting group, tie line trunk 108 or the universal answer trunk 130, individual lines 403 may be strapped to particular input lines 405 to the multifrequency pad 406. However, if additional flexibility is desired, a programmable matrix 404, such as that shown in FIG. 7, may be utilized. The programmable matrix 407 includes ten sets of ten AND gates each, 408-D1 through 408-D10. Each of the AND gates 408 in a set has its output connected to a different dial digit line 405. Each of the AND gates 408 in a set has one of its inputs AND gates connected to the line 403 corresponding to a particular digit number output from the decoder 408. The other inputs of the individual AND gates 408 in the set are each connected to a different bus 412-N in a program field 414. A plurality of enable program lines P1, P2 and PN (only three program lines are shown) are provided and arranged to receive enabling signals from a programming means (not shown) or, for example, from a seized incoming trunk 60. The programming lines are selectively connectable to individual buses 412-N connected to the second input of AND gate 408 (corresponding to any desired digit number) in a particular set of AND gates 408. As is apparent, the programming field 414 may be connected in any predetermined manner and, depending upon the particular sequence of enabling signals on the lines P1-PN, any desired sequence of dialed digit numbers may be transmitted via lines 405 to the MF pad 406. For example, in the program matrix 404 shown if line P1 is enabled, the dialed digits "20" will be transmitted as outputs from the matrix when the binary decoder 402 transmits digit 1 and digit 2 over lines 403.

Under normal conditions, the register 34 will receive the programmed number of digits for the particular telephone office and provide for switchthrough in connecting the call to the desired termination. After switchthrough, the register 34 releases deenergizing the SLR relay which in turn will remove the ground from the SLR lead 286, disabling the NEN signal which in turn turns off the ADE signal, disabling the automatic dialer circuit 111. If the register 34, after receiving, the correct number of digits, does not perform its normal function and, therefore, remains locked up the binary counter 402 continues to count until the count of ten is reached at that time, a flip-flop 420 is set and transmits a repeat (RPE) signal via line 421 to the answer circuit 110. At the same time, the RPE signal disables the MF pad 406 via an AND gate 422. The RPE signal transmitted via the line 411 operates the register non-release timer 220 which in turn transmits via a line 423 a release destination signal (RDC) to the operator loop circuit 78. The RDC signal simulates the release destination switch which would normally be operated by the operator, thereby dropping the register 34 forcefully from its existing connection. The dropping of the register 34 in turn removes the SLR signal on line 286, and the ADE signal on line 290 and the automatic dialer circuit 110 is disabled.

At the same time, a restart (RSTC) signal is transmitted via a line 430 and resets the STC control flip-flop 200 which starts the register seizure program in the same manner as described above.

The two bit counter circuit 216 counts the attempts made to process a particular incoming call. When the count of three is reached in counter circuit 216, a force release (FRL) is transmitted via a line 450 which operates the loop release control circuit (consisting of flip-flops 212 and 214) to transmit an LRC signal via a line 451, to the operator loop circuit 78 and position circuit 88. The LRC signal provides for a complete disconnection of the loop to the truck circuit 60, thus insuring that the universal answer arrangement does not get locked up, if a call cannot be processed from a particular trunk.

Referring now to FIG. 6, if the requested connection through the register 34 is successful, the loop circuit 78 goes into its normal ringing mode in the conventional manner and prepares to receive an answer supervision signal. At the same time, a PLR signal is transmitted from the position circuit 88 (via a line 452) which will free the automatic answer arrangement by operating the normal release detect flip-flop 204 which in turn operates the loop release control circuit to transmit an LRC signal under answer supervision or trunk call.

When the incoming call connected into the operator loop circuit 78, an LF high signal is transmitted from the front port of the incoming trunk via the operator loop circuit 78 and the corresponding one of lines 454 to one input of a corresponding AND gate 455. When answer supervision is received from the rear pair of tip and ring leads of the connected trunk an LR high signal is transmitted via the associated line 456 enabling the AND gate 455 which transmits a normal position release (NPR) signal via a line 458 to the second input of the AND gate 270. The AND gate 270 is enabled and sets the loop release control flip-flops 212 and 214 which in turn enable the AND gate 459 and an LRC signal is transmitted to the operator loop position circuits 78 and 88 for loop release. In addition after three attempts have been made to connect a particular incoming call, the third attempt release circuit 216 is set transmitting an FRL signal via the line 450 and AND gate 460 is enabled transmitting an IST signal via the line 279 to the AND gate 278 to inhibit transmittal of an STC signal via the AND gate 284.

If, in attempting to connect an incoming trunk 60 to the termination identified as the answer circuit, an equipment busy condition is present in the PABX system, an JCBSY signal will be transmitted from the common control via the operator position circuit 88 and a line 470 to the other input of the AND gate 268 is partially enabled by NEN. The AND gate 268 is enabled and sets the busy release inhibit flip-flop 206 which will prevent the inadvertent disabling of the AND gate 267 which prevents the loop release control flip-flops 212 and 214 from being enabled.

When the busy release inhibit flip-flop 206 is set, a BYNT signal is transmitted via a line 470 to an AND gate 472 to partially enable a count in the third attempt release circuit 216. The AND gate 472 is fully enabled when the SLR signal on line 286 goes high indicating that the local register 34 has been released. When the RSE signal on the line 243 goes high, indicating that a release of the operator circuits from the trunk has been accomplished, a CD signal, transmitted via a line 474, resets the third attempt release circuit 216.

When the line or trunk to which the universal answer arrangement is attempting to make a call is busy, a ground signal (AB) appears on a line 330 and energizes an optoelectronic isolator 332 which has an output circuit busy signal (BZE) which is transmitted via a line 334, and is transmitted out as a BZ(out) signal via a line 336 to the operator position circuit 88 which in turn transmits a busy signal into the common control preventing any further calls from being routed to an operator loop 78.

Figure 8:
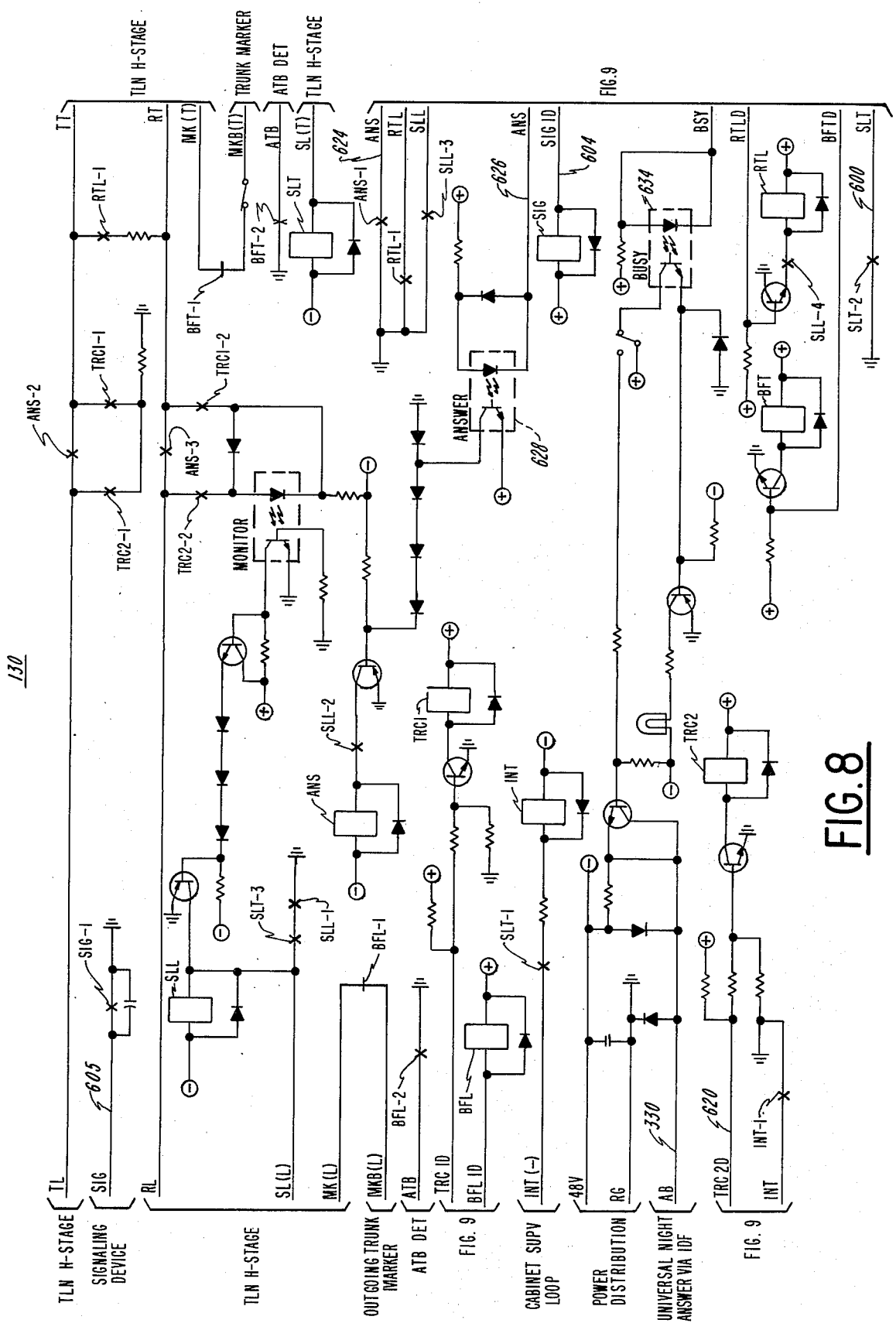
FIGS. 8 and 9 are electrical schematic wiring diagrams of a universal answer trunk constructed in accordance with the present invention.
Figure 9:
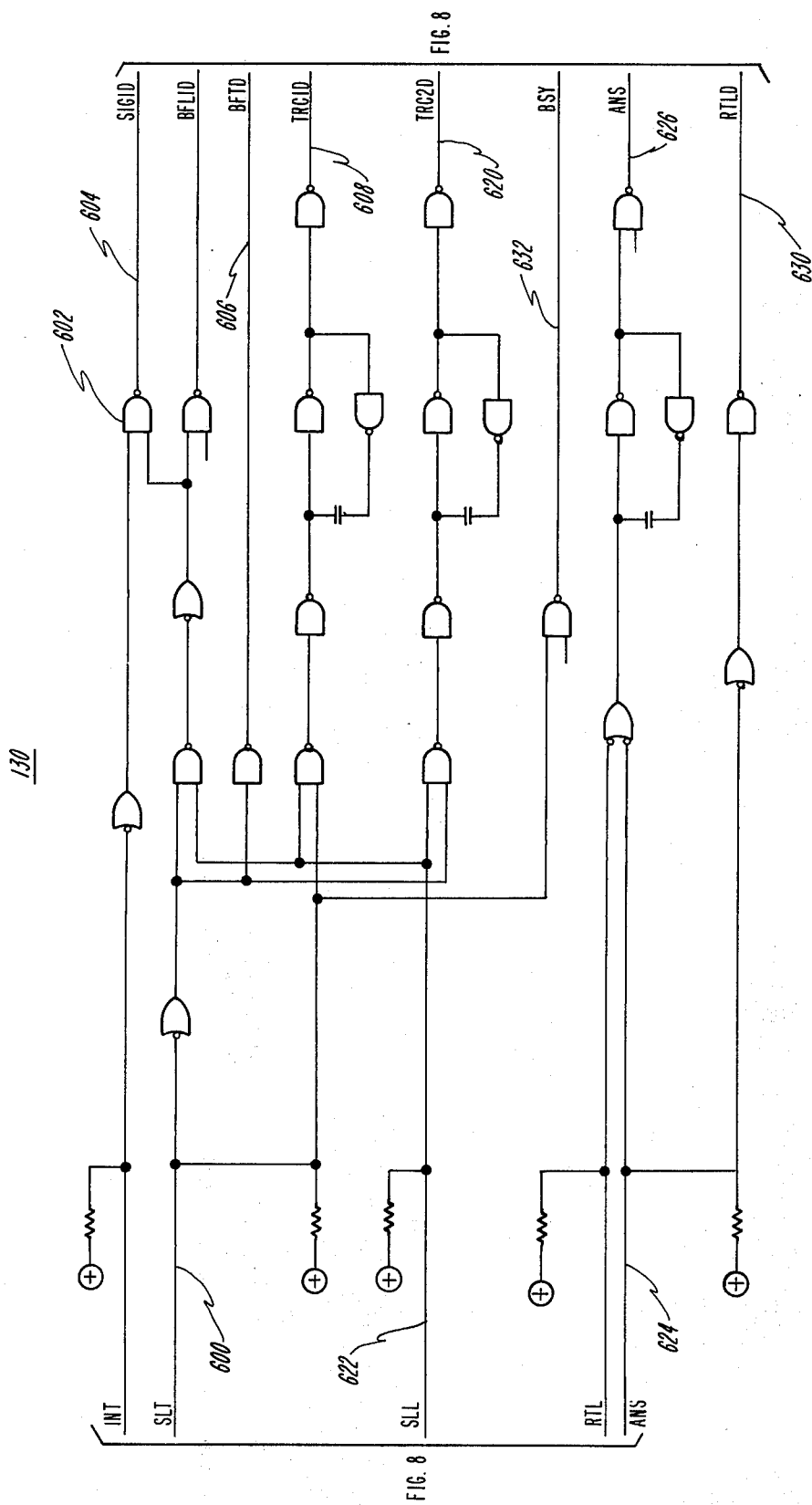

Referring now to FIGS. 8 and 9, there is shown an electrical schematic wiring diagram of a universal answer trunk 130. When the automatic dialer 111 directs an incoming call to the universal answer trunk 130, (by outpulsing the sequence of digits which will be translated by the number and code translator 46 as the address of the universal answer trunk 130), the trunk marker marks the trunk 130 via an MKB(T) lead normally, closed contact pair BFT-1 and an MK(T) lead to the TLN H-stage as is conventionally done in connections to trunks. Through the TLN H-stage an SL(T) signal is returned, energizing a relay SLT. When the relay SLT is energized, normally open contact pair SLT-1 closes permitting a relay INT to be energized at a frequency corresponding to a pulsing INT signal provided by the system supervisory. The normally open contact pair SLT-2 also closes providing a signal SLT over a line 600 which partially enables an AND gate 602. The AND gate 602 is fully enabled each time the INT signal goes low, transmitting an interrupted signal (SIGID) via a line 604 to interruptedly energize a relay SIG. Each time the relay SIG is energized, normally open contact pair SIG-1 closes, transmitting a ground pulse (SIG) via a line 605 to the signalling device 132 which permits the signalling device to become energized. In addition, the SLT signal is transmitted as a BFTD signal via a line 606 which energizes a relay BFT, opening the normally closed contact pair BFT-1 in the mark lead circuit to prevent further seizure of this particular port of the trunk 130.

By way of a loop from the originating trunk through the TLN, the SLT signal also transmits a signal TRC1D via a line 608 which energizes a relay TRC1 closing normally open contact pairs TRC1-1 and TRC1-2 for answer battery back to the incoming trunk.

In response to the audible signaling device 132 an individual can bo to any telephone located at the PABX facility and dial an appropriate code which is translated by the number and code translator 46 into the address for the second port of the universal answer trunk 130. The outgoing trunk marker seizes the second port of the trunk by providing a signal on MKB(L) lead through the normally closed contact pair BFL-1 and back to the TLN H-stage via the lead MK(L). At this time the SLT signal is present; however, an SLL signal has not yet been received. Therefore a TRC2D signal is transmitted via a line 620 and energizes a relay TRC2 thereby closing normally open contact pairs TRC2-1 and TRC2-2 permitting battery and groung to be returned via the ring (RL) and tip (TL) leads to the junctor control (not shown) to permit connection of the trunk port to the line from which the code was dialed in the conventional manner. Upon detecting the battery and ground, a sleeve signal SLL will appear on lead SL(L) temporarily bringing up the SLL relay which in turn will close normally open contact pair SLL-1, providing a self-holding path and supply a permanent ground via closed contact pairs SLL-1 and SLT-3 to the sleeve lead SL(L) in the TLN. Normally open contact pair SLL-3 is also closed, transmitting an SLL signal via a line 622 which disables the TRC2D signal present on the line 620. In addition, normally open contact pair SLL-2 closes and energizes an answer relay ANS which in turn closes a normally open contact pair ANS-1 which permits a ground signal ANS to be transmitted via a line 624 to generate a low signal via a line 626 which energizes an optoelectronic answer isolator 628 to provide a holding path to the relay ANS. When the answer ANS signal is present on the line 624 an RTLD signal is transmitted via a line 630 to operate a relay RTL (the normally open contact pair SLL-4 was closed when the relay SLL was energized). The RTL relay closes a normally open contact pair RTL-1 tripping the ringing circuit in the terminated line circuit.

When the answer optoelectronic coupler becomes energized, normally open contact pairs ANS-2 and ANS-3 are closed, thereby providing connection between the two ports of the universal answer trunk 130 and permitting the incoming trunk to be connected to the line circuits which are called port number 2 of the universal answer trunk 130.

A busy indication is provided when the SLT relay is energized and a BSY signal is transmitted via a line 632 and energizes a busy optoelectronic isolator 634 turning on a lamp and providing a ground (AB) signal via the line 330 to the universal night answer circuit to prevent it from processing additional calls until the universal answer trunk 130 has been released.

From the foregoing it will be appreciated that a universal answer arrangement constructed in accordance with the present invention permits the automatic connection of incoming calls to a predetermined or programmable answer circuit when all attended operator positions are busy and an unattended position is marked busy and is connected for universal answer service. In addition the answer arrangement of the present invention may be utilized to automatically direct calls to a designated or programmable line or trunk circuit at night, or to a destination based on origin.

The universal answer arrangement may also be programmed to direct incoming calls to a hunting group in order that more than one call may be answered at a time (for Example, at night when all of the operator positions are unattended). Incoming calls may also be directed to a universal answer trunk which causes a signalling device to be energized and personnel located anywhere in the PABX facility may pick up any telephone set in response to the audible signal and, simply by dialing a code, automatically be connected to the incoming call. Furthermore, incoming calls may be connected to a tie line trunk and thereupon to another commonly-owned PABX facility where a night attendant is on duty.

The universal answer arrangement provides all of the foregoing features simply by the addition of a relatively small amount or circuitry to the existing facility, without requiring substantial redesign of the previously installed circuitry.

It will be apparent to those skilled in the art that various modifications in form and detail may be made from the foregoing description of a particular embodiment of the invention without departing from the spirit and scope of the appended claims.

What is claimed is:

1. An answer arrangement for use in a private automatic branch exchange having a plurality of trunks each with a first port for connection to a transmission path from one subscriber and a second port for connection to a transmission path to another subscriber, a switching network through which the trunks may be connected to an operator console via a position circuit in the absence of a position busy indication at the position circuit, common control means responsive to service requests from the trunks for marking a trunk for connection through the switching network and further responsive to the service requests for generating request signals, easn of the plurality of trunks having a trunk circuit means which is actuated for connecting the first and second ports to the switching network and which is deactuated for disconnecting the first and second ports from the switching network and interconnecting the two ports within the trunk, the trunk circuit means being initially actuated when its respective trunk is first marked by the connon control means, and an operator circuit means including first and second transmission pairs for connection, respectively, to the first and second ports of a connected trunk, means responsive to a request signal from the common control for connecting the loop circuit through the switching network to the marked trunk, the answer arrangement comprising:
   first circuit means for overriding a position busy indication at a position circuit and for permitting a trunk to be connected to the position circuit via the switching network,
   second circuit means for inhibiting the transmission of an answer supervision signal from the position circuit to the marked trunk,
   third circuit means for utilizing the existing operator circuitry for connecting the marked trunk to a designated destination, and
   programmable circuit means arranged to selectively modify the designated destination.

2. An answer arrangement according to claim 1 wherein the programmable circuit means is arranged selectively to connect the marked trunk to any one of a group consisting of a line circuit, a pilot number of a hunting group, a tie line trunk, and a trunk arranged to provide an audible indication of an incoming call.

3. An answer arrangement for use in a private automatic branch exchange having a plurality of trunks each with a first port for connection to a transmission path from one subscriber and a second port for connection to a transmission path to another subscriber, first connecting circuit means through which the trunks may be connected to an operator console via a position circuit in the absence of a position busy indication at the position circuit, second connecting circuit means for marking and connecting a trunk through the first connecting circuit means, each of the plurality of trunks having a trunk circuit means which is actuated for connecting the first and second ports to the first connecting circuit means and which is deactuated for disconnecting the first and second ports from the first connecting circuit means and interconnecting the two ports within the trunk, the trunk circuit means being initially actuated when its respective trunk is first marked by the second connecting circuit means, and an operator circuit means including first and second transmission pairs for connection, respectively, to the first and second ports of a connected trunk, means responsive to a signal from the second connecting circuit means for connecting the loop circuit via the first connecting circuit means to the marked trunk, the answer arrangement comprising:

first circuit means for overriding a position busy indication at a position circuit and for permitting a trunk to be connected to the position circuit via the first connecting circuit means, second circuit means for inhibiting the transmission of an answer supervision signal from the position circuit to the marked trunk, third circuit means for utilizing the existing operator circuitry for connecting the marked trunk to be designated destination, and programmable circuit means arranged to selectively modify the designated destination.

4. An answer arrangement according to claim 1 wherein the designated destination comprises an answer trunk arranged to provide an audible indication of the connection of an incoming call to the marked trunk and to the answer trunk.

5. An answer arrangement according to claim 4 wherein the answer trunk is arranged to effect a connection between the incoming trunk and one of a plurality of line circuits in response to signals transmitted from the line circuit.

6. An answer arrangement according to claim 1 further comprising signalling means responsive to the destination designated by the programming means to transmit signals representative of the destination to a connected local register and timing means, responsive to a failure of the signals transmitted to the register to effect a connection to the designated destination after a predetermined time, to generate a release signal to the operator circuit means for releasing the register from the operator circuit means.

7. An answer arrangement according to claim 6 further comprising retry circuit means responsive to the release signal generated by the timing means to attempt another connection to the designated destination.

8. An answer arrangement according to claim 7 further comprising counting means responsive to the failure of a predetermined number of attempts to connect an incoming call to the designated destination for transmitting an operator release signal to the operator circuits for releasing the operator circuits from the marked trunk.

* * * * *